United States Patent
Jousset et al.

(10) Patent No.: US 6,835,304 B2
(45) Date of Patent: Dec. 28, 2004

(54) DEVICE FOR MONITORING OF A COOLANT REGENERATION SYSTEM

(75) Inventors: Todd A. Jousset, Ceres, CA (US); Edward R. Eaton, IV, Phoenix, AZ (US); Steven R. Knight, Modesto, CA (US)

(73) Assignees: The Penray Companies, Inc., Wheeling, IL (US); Parker Hannifin Corporation, Modesto, CA (US)

( * ) Notice: Subject to any disclaimer, the term of this patent is extended or adjusted under 35 U.S.C. 154(b) by 80 days.

(21) Appl. No.: 10/152,103

(22) Filed: May 21, 2002

(65) Prior Publication Data

US 2002/0189982 A1 Dec. 19, 2002

Related U.S. Application Data

(63) Continuation-in-part of application No. 09/855,913, filed on May 15, 2001, now Pat. No. 6,475,379, which is a continuation of application No. 09/520,433, filed on Mar. 8, 2000, now Pat. No. 6,235,194.

(51) Int. Cl.[7] .............................. F28F 19/00; F28F 19/04
(52) U.S. Cl. ...................... 210/85; 210/206; 123/198 E
(58) Field of Search ..................... 73/865.8, 86; 422/53; 137/68.18; 165/134.1; 123/41.15, 198 E; 210/167, 198.1, 85, 206, 205

(56) References Cited

U.S. PATENT DOCUMENTS

| | | |
|---|---|---|
| 2,696,915 A | 12/1954 | Kasten et al. |
| 3,122,501 A | 2/1964 | Hultgren |
| 3,291,314 A | 12/1966 | Rosaen |
| 3,809,150 A * | 5/1974 | Holmes ........................ 165/51 |
| 4,147,596 A * | 4/1979 | Baboian et al. .......... 205/775.5 |
| 4,246,109 A | 1/1981 | Manders |
| 4,333,516 A | 6/1982 | Krueger et al. |
| 4,668,393 A | 5/1987 | Stone |
| 4,782,891 A | 11/1988 | Cheadle et al. |
| 4,834,885 A | 5/1989 | Misgen et al. |
| 5,024,268 A | 6/1991 | Cheadle et al. |
| 5,290,445 A | 3/1994 | Buttery |
| 5,441,637 A | 8/1995 | Gutjahr et al. |
| 5,462,675 A | 10/1995 | Hopkins et al. |
| 5,643,446 A | 7/1997 | Clausen et al. |
| 5,695,633 A | 12/1997 | Ernst et al. |
| 5,707,518 A | 1/1998 | Coates et al. |
| 5,753,116 A | 5/1998 | Baumann et al. |
| 5,770,065 A | 6/1998 | Popoff et al. |
| 5,785,850 A | 7/1998 | Lynch et al. |
| 5,807,481 A | 9/1998 | Hodgkins et al. |
| 5,891,334 A | 4/1999 | Gundrum et al. |
| 6,098,575 A * | 8/2000 | Mulshine et al. ........ 123/41.15 |
| 6,113,781 A | 9/2000 | Popoff et al. |
| 6,235,194 B1 | 5/2001 | Jousset |

FOREIGN PATENT DOCUMENTS

DE          4330840 C1     9/1993

OTHER PUBLICATIONS

The Penray Companies, Inc., "Penray® Need–Release® Extended Life Cooling System Treatment", Product Data Sheet, 2 pages, Product Data Sheet No.: TT–2088–91, Quality Service Technology, not dated.

* cited by examiner

Primary Examiner—Terry K. Cecil
(74) Attorney, Agent, or Firm—Wildman, Harrold, Allen & Dixon, LLP (57) ABSTRACT

A coolant regeneration system having a housing with an inlet port and an outlet port adapted to be in flow communication with a coolant stream and a filter positioned in the coolant stream. A regeneration canister containing a corrosion inhibitor is positioned in the coolant stream and a monitoring device to monitor the operation of the system. The monitor device includes a temperature sensing element. The monitor device includes a regeneration canister deterioration sensor. Methods of the invention are also included. The invention further includes an integrity probe positioned against a wall of the regeneration canister and a non-corrosive coating positioned on the wall of the canister and between the canister and the integrity probe.

62 Claims, 7 Drawing Sheets

DEVICE FOR MONITORING OF A COOLANT REGENERATION SYSTEM

CROSS REFERENCE TO RELATED APPLICATION

The application is a continuation-in-part of U.S. patent application Ser. No. 09/855,913 entitled "Recharge and Filter Assembly with Replaceable Cartridge" of Todd A Jousset and Steven R. Knight filed May 15, 2000, now U.S. Pat. No. 6,475,379 which is a continuation of U.S. patent application Ser. No. 09/520,433, filed Mar. 8, 2000, now U.S. Pat. No. 6,235,194.

FIELD OF THE INVENTION

This invention relates generally to coolant maintenance systems and, more particularly, to a liquid coolant maintenance system in an internal combustion engine.

BACKGROUND OF THE INVENTION

The importance of maintaining a cool running engine is well known in the art of engine maintenance. In order to ensure that engines operate within a particular temperature range, cooling systems have been incorporated in the design of internal combustion engines so as to circulate a coolant throughout the engine. During the operation of the cooling system, a stream of liquid coolant runs through a radiator and related piping where corrosion inhibitors contained within the coolant may be lost due to leakage or breakdown over time. This loss or breakdown of corrosion inhibitors results in the corroding of the components of the cooling system, thereby degrading the entire system.

It is well-known in the art to regenerate the coolant by introducing replacement corrosion inhibitors into the coolant stream. This regeneration is accomplished automatically by having the replacement corrosion inhibitors introduced into the coolant stream as a result of the corroding of a regeneration canister containing replacement corrosion inhibitors. As a result, an opening is created in the canister exposing the replacement corrosion inhibitors and thereby releasing them into the coolant stream. A problem exists, however, in that one cannot determine when the regeneration canister needs to be replaced. Because of this, an engine operator runs the risk of wasting unused replacement inhibitors by prematurely replacing the regeneration canister before the inhibitors have been depleted, or damaging the engine by corroding the cooling system because of a lack of inhibitors in the coolant. Given this problem, a monitoring system that informs an engine operator as to when the supply of replacement corrosion inhibitors had been used up and a new regeneration canister needs to be installed, is believed to be an improvement in the art.

Similarly, it is not desirable for engine coolant to contain contaminates. Thus, if a filter in a coolant maintenance system becomes blocked or clogged, it is believed to be an improvement in the art to have a monitoring system which informs the engine operator of the same.

SUMMARY OF THE INVENTION

The present invention of a coolant regeneration system includes a housing having an inlet port and an outlet port adapted to be in flow communication with a coolant stream, a filter positioned in the coolant stream, a regeneration canister containing a corrosion inhibitor positioned in the coolant stream and a monitoring apparatus for monitoring the operation of the system.

The present invention also includes a coolant regeneration system which includes a housing having an inlet port and an outlet port adapted to be positioned in flow communication with a coolant stream, a filter positioned in the coolant stream, a regeneration canister containing a corrosion inhibitor positioned in the coolant stream and a temperature sensing element positioned in coolant stream.

The present invention further includes a coolant regeneration system which includes a housing having an inlet port and an outlet port adapted to be in flow communication with a coolant stream, a filter positioned in the coolant stream, a regeneration canister containing corrosion inhibitor positioned in the coolant stream and a regeneration canister deterioration sensor.

The present invention also includes a method for maintaining the operation of a coolant regeneration system having a filter in flow communication with a coolant stream in which the method comprises the steps of providing a temperature sensing element to activate a warning indicator upon sensing a temperature less than a predetermined temperature and positioning the temperature sensing element so as to be capable of sensing the temperature of the coolant stream.

The present invention includes a method for maintaining the operation of a coolant regeneration system which includes a regeneration canister containing a corrosion inhibitor, in which the canister is positioned in a coolant stream, the method comprises the steps of providing a canister deterioration sensor to activate a warning indicator upon structural failure of a wall of the canister and positioning the canister deterioration sensor so as to be capable of detecting the structural failure of the wall of the regeneration canister.

The invention also includes a coolant regeneration system having a housing with an inlet port and an outlet port in flow communication with a coolant stream, a filter and a regeneration canister containing a corrosion inhibitor positioned in the coolant stream, which includes an integrity probe positioned against a wall of the regeneration canister and a non-corrosive coating positioned on the wall of the canister and between the canister and the integrity probe.

BRIEF DESCRIPTION OF THE DRAWINGS

The foregoing objects and advantageous features of the invention will be explained in greater detail and others will be made apparent from the detailed description of the various embodiments of the present invention which are given with reference to the several figures of the drawing, in which.

DETAILED DESCRIPTION

Figure 1:
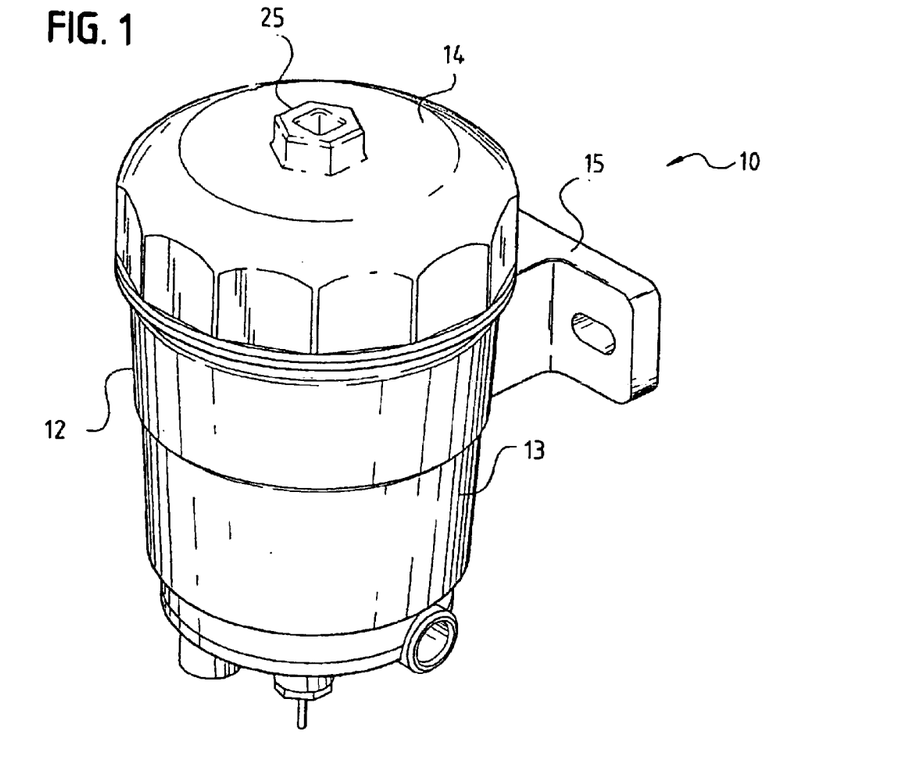
FIG. 1 is a perspective view of the present invention.
Figure 2:
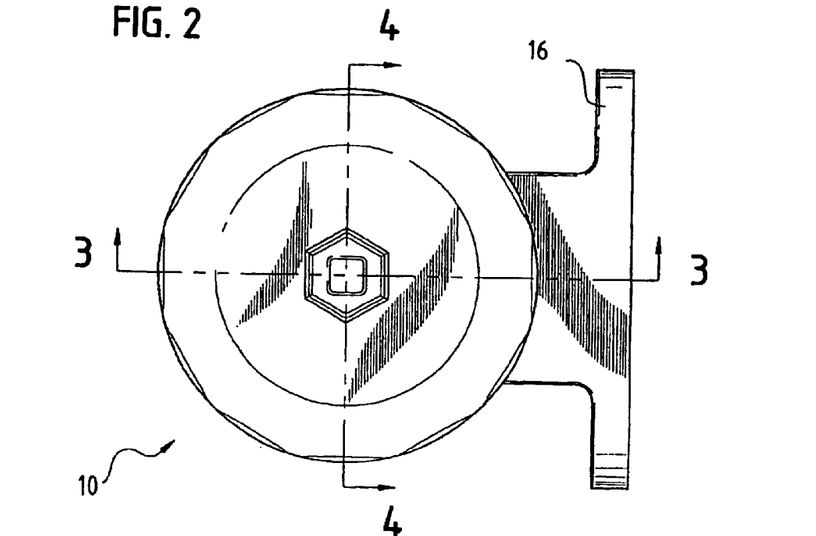
FIG. 2 is an end view of FIG. 1.

The following description includes providing an understanding of the operation of the coolant regenerative system to assist in understanding the environment in which the invention operates. Additionally, the following description utilizes, as an example, a coolant system in a truck motor vehicle combustion engine. In referring to the drawings, coolant regeneration and filter device 10, as shown in FIGS. 1 and 2, has an outer housing 12 comprising a cylindrical canister 13 and a removable cover 14. The housing 12 can be secured at an appropriate location to be in communication with a fluid coolant system of typically a combustion vehicle engine with bracket 16. The canister 13 and cover 14 are formed from appropriate material (e.g., aluminum, plastic) using commercial techniques (e.g., stamping, molding, etc.).

Regeneration and filter device 10 is connected to the liquid coolant system of a combustion engine wherein the coolant often time is diverted from the coolant system and through the regeneration and coolant device 10. Device 10 is useful in the replacement of corrosive inhibitors that are depleted from a liquid combustion engine coolant during the operation of the engine and for filtering impurities that find their way into the liquid coolant.

Figure 3:
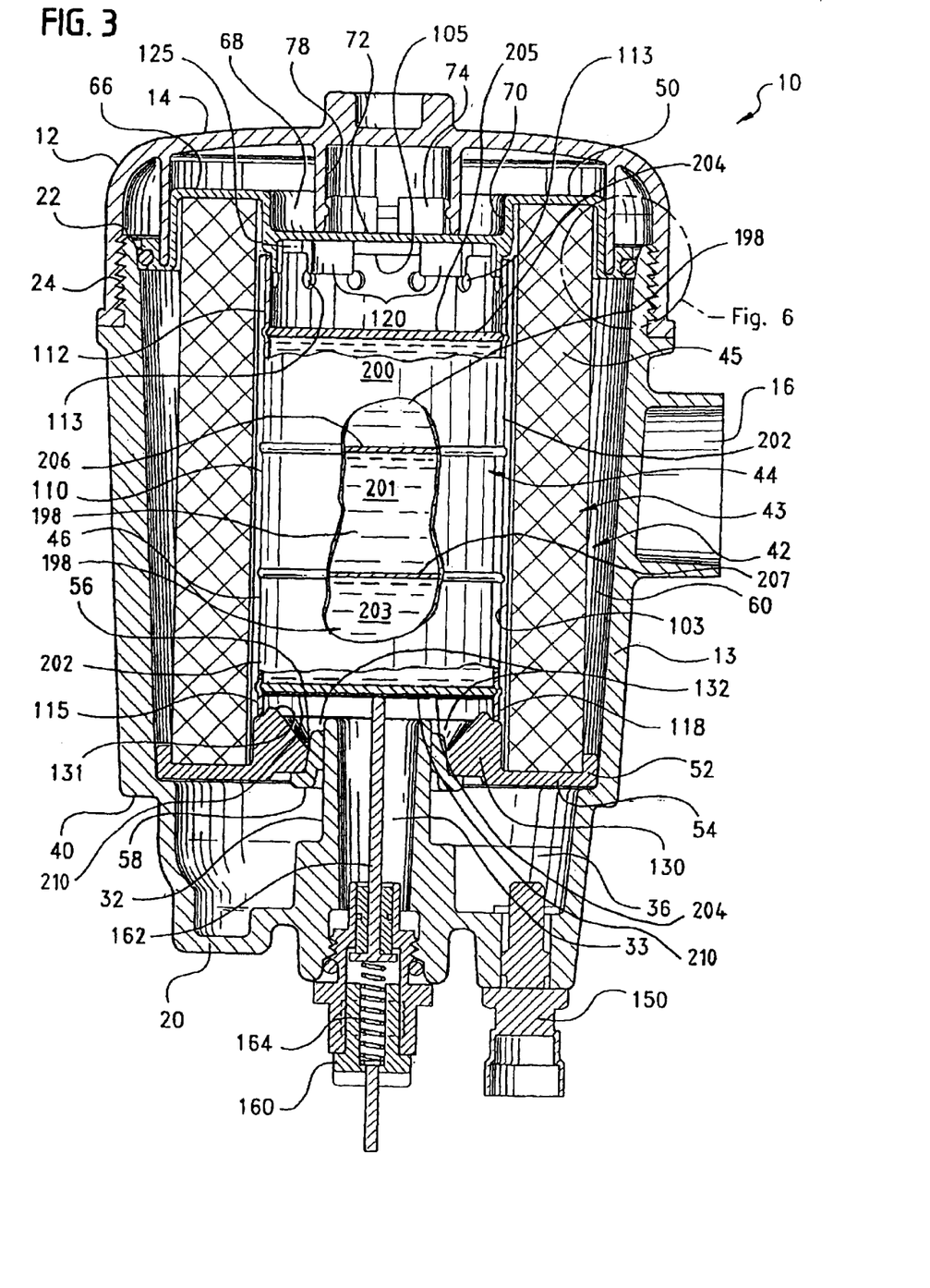
FIG. 3 is a cross section view taken along line 3—3 as seen in FIG. 2 with a partial cut away view of the regeneration canister.
Figure 4:
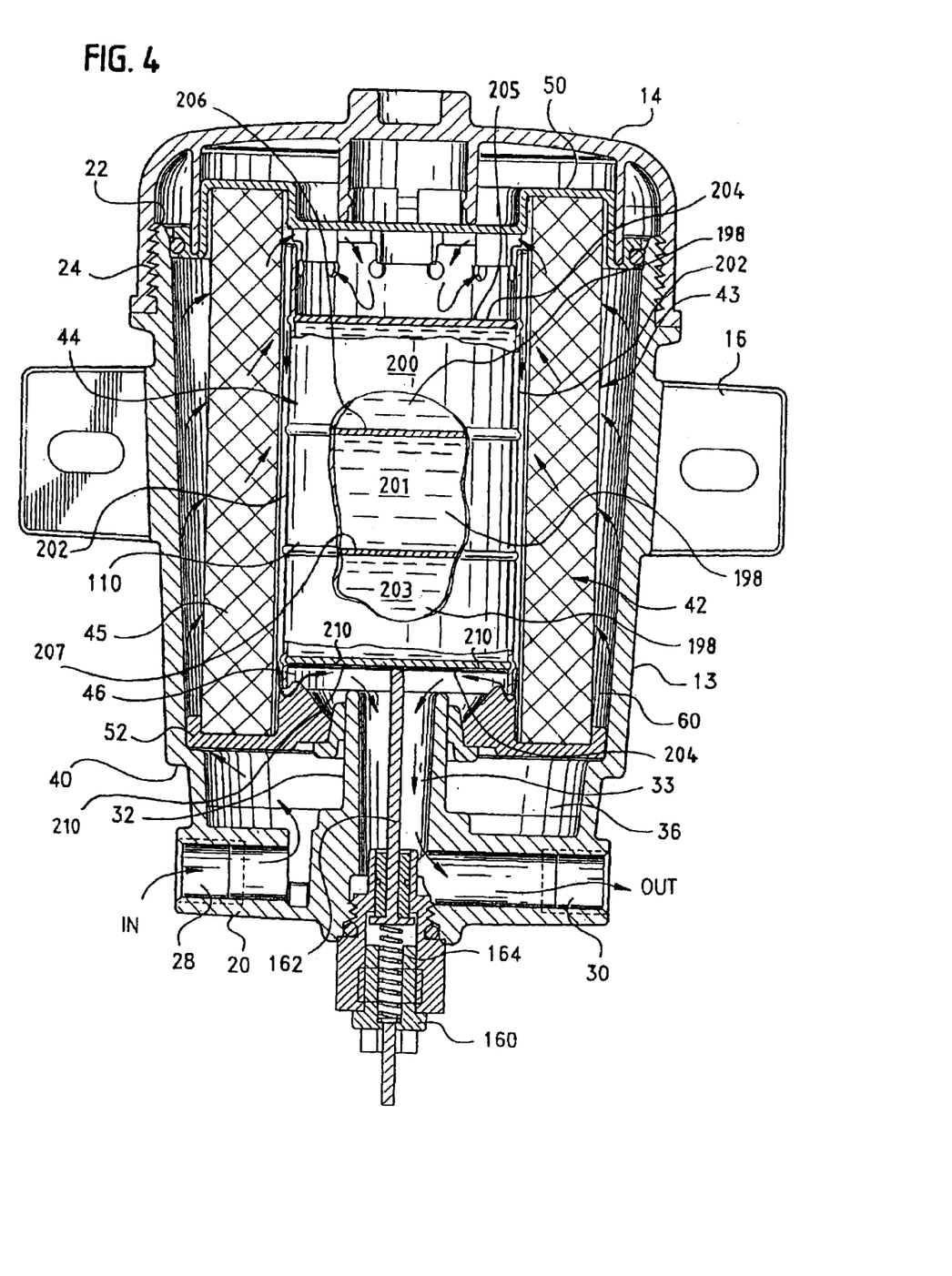
FIG. 4 is a cross section view taken along line 4—4 as seen in FIG. 2 with a partial cut away view of the regeneration canister.

Referring now to FIGS. 3 and 4, the housing of canister 10 includes a closed lower end 20 and an open upper end 22. The canister 13 and cover 14 have cooperating threads 24 and the proper geometry as at 25 (FIG. 1) to allow the cover to easily be screwed on to or off of the canister 13. The lower end of the canister includes an inlet port 28 and outlet port 30. It should be understood that this designation could be reversed and inlet port 28 could be considered an outlet port and outlet port 30 could be considered an inlet. The ports of the canister are connected in a liquid line, such as parallel bypass line, in the cooling system.

A short cylindrical standpipe 32 extends centrally within housing 13 from the closed end 20 toward the open end 22. Standpipe 32 includes a central flow passage 33 fluidly connected to inlet port 28. A chamber 36 is provided in surrounding relation to the standpipe 32 in the lower portion of housing canister 13, and is fluidly connected to inlet port 28. Housing canister 13 further includes a radially inward-projecting annular shoulder 40 formed near the lower end of the canister, the reason for which will be described herein in more detail.

A recharge and filter cartridge, indicated generally at 42, is located internally of housing 12. Cartridge includes a filter element portion indicated generally at 43, and a recharge canister portion indicated generally at 44. The filter element portion 43 includes ring-shaped filter media 45 circumscribing a central cavity 46. The type of filter media appropriate for the element can be easily determined by one or ordinary skill in the art depending upon the particular application.

The filter element 43 includes a first or upper end cap 50 at the upper end of the filter media 45, and a second or lower end cap 52 at the lower end of the filter media 45. As shown in FIG. 3, the lower end cap 52 includes an annular body portion 54 fixed (e.g., bonded with adhesive) to the lower end of the filter media 45, and defining a central circular opening 56. A resilient annular seal 58 is carried by the lower end cap 52, and bounds the opening 56. Seal 58 projects radially inward into sealing engagement with central standpipe 32 when the cartridge is located within the housing.

Figure 5:
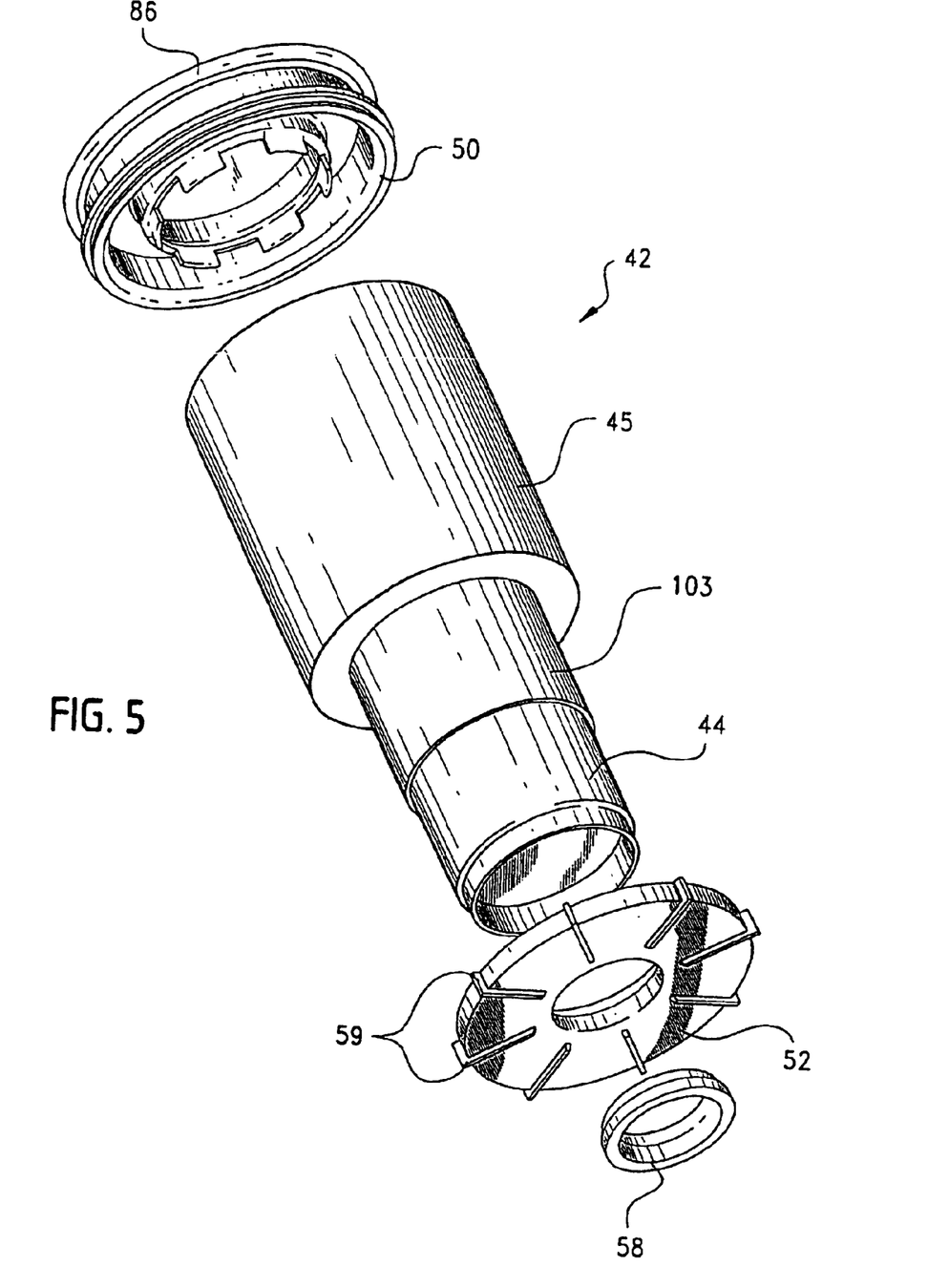
FIG. 5 is an exploded view of the regeneration and filter cartridge.

The lower end cap 52 further includes axially downwardly and radially-outward projecting ribs as at 59 (FIG. 5), which support the lower end cap on the shoulder 40 of the housing canister 13 when the cartridge is inserted within the housing. The ribs 59 define flow paths between an annular peripheral cavity 60 defined between the radially outer surface of the filter element 43 and the housing canister 13, and the cavity 36 in the lower end of the housing. The lower end cap 52 is preferably formed unitary in one piece from appropriate material (e.g., plastic) using appropriate techniques (e.g., molding).

The upper end cap 50 similarly includes an annular body portion 66 fixed (e.g., bonded with adhesive) to the upper end of the filter media 45. The upper end cap 50 includes a well area 68 extending radially inward from annular body portion 66, and fluidly closing the upper end of the element. Well area 68 includes a cylindrical side wall 70 extending axially inward along the inner diameter of the filter media 45 from the annular body portion 66, and a planar end wall 72 which is integral with the axially inner end of side wall 70. A plurality of latching fingers 74 are provided with first end cap 50, and project axially upward (outward) from the upper surface of the planar end wall 72. Latching fingers 74 are preferably located in an evenly spaced annular arrangement along the end wall 72. The latching fingers 74 of the upper end cap 50 cooperate with a mating ring 78 projecting axially downward from cover 14. Latching fingers 74 and ring 78 preferably removably couple the cartridge to the cover, such that when the cover is removed from canister 13, the cartridge is likewise removed. While ring 78 is shown as a continuous annulus, it should be appreciated that other structure (such as discrete fingers) could be provided on the cover to couple the cartridge to the cover.

Figure 6:
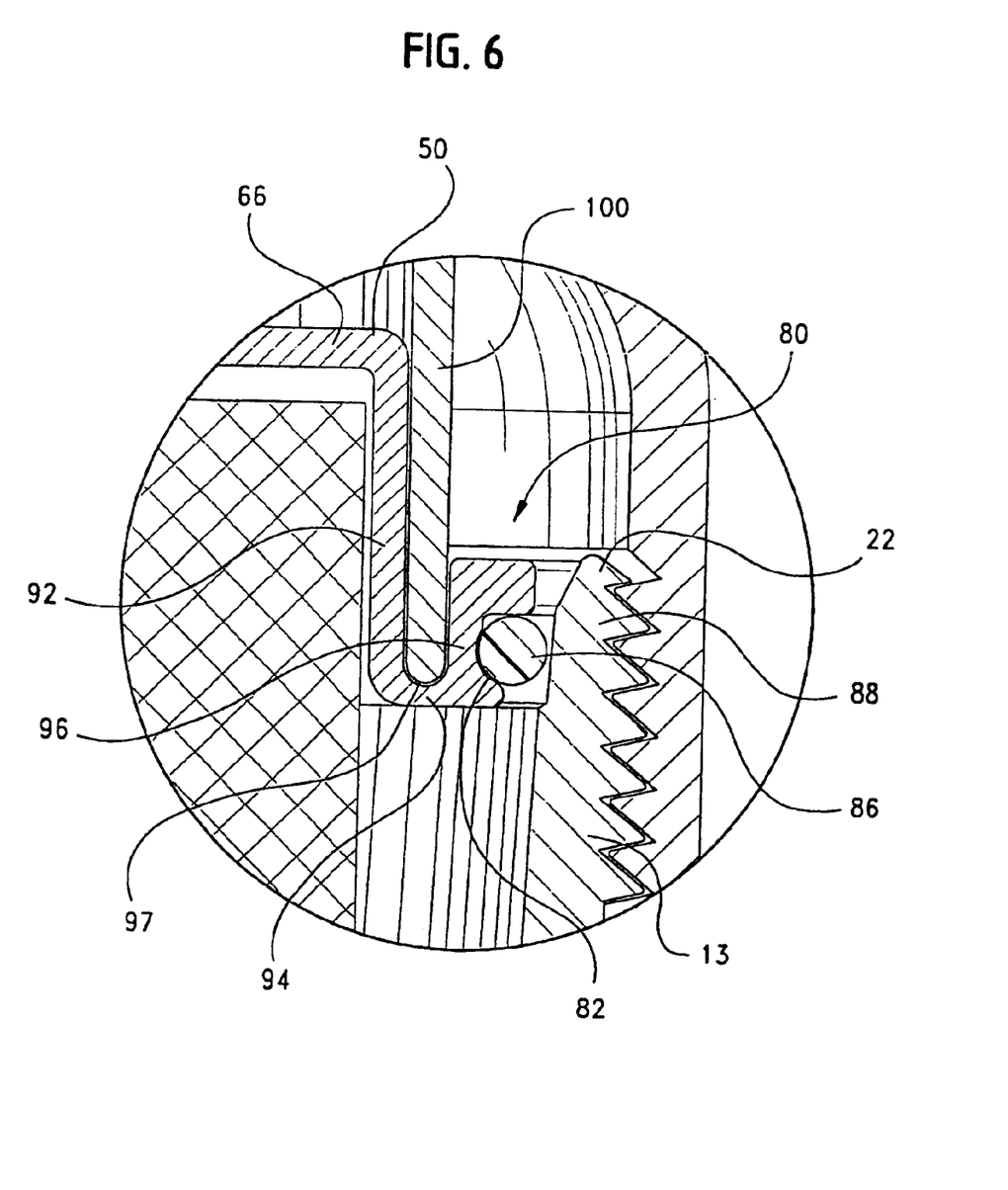
FIG. 6 is a cross-sectional, enlarged view of a portion of the assembly in FIG. 3.

As shown in FIG. 6, the upper end cap 50 further includes a radially outward-projecting flange portion, indicated generally at 80. Flange portion 80 includes a radially outward-facing groove 82, and a resilient annular O-ring gasket 86 is located in groove 82. O-ring gasket 86 projects radially outward from the groove, and provides a fluid-tight seal against a gland portion 88 proximate open end 22 of canister side wall 13. The flange portion includes a cylindrical portion 92 extending axially downward from the annular body portion 66 and bounding the radially outer surface of filter media 44. An annular end wall portion 94 is provided at the inner, lower end of the cylindrical portion 92, and projects radially outward therefrom. A cylindrical portion 96 then extends axially upward from the radially-outer periphery of end wall 94. The cylindrical portion 96 extends in radially outward-spaced relation to cylindrical portion 92, to define an annular channel or groove 97. The upper end cap 50 is also preferably formed from appropriate material (e.g., plastic) using appropriate techniques (e.g., molding).

Cover 14 includes an annular, axially-extending support wall 100 formed integral (unitary) with the cover. The support wall is closely received within channel 97 and abuts end wall 94. The wall is bounded on its inner diameter by cylindrical wall portion 92, and at its outer diameter by cylindrical wall portion 96. Support member 100 supports the upper end cap 50 in the housing, particularly during high pressure operation. In addition, the location of the support wall 100 proximate to seal 86 facilitates maintaining a proper seal between the upper end cap 50 and the housing canister 13.

The mating ring 78 on cover 14 extends into abutting relation to planar end wall 72 of the upper end cap to provide additional axial support for the upper end cap.

A cylindrical imperforate weir 103 is provided internal to filter media 45 to support the inner diameter of the media.

Weir 103 extends axially upward from lower end cap 54 toward upper end cap 50. An annular flow passage, indicated at 105 (FIG. 3), is provided between the upper end of the weir and the upper end cap 50. Alternatively, the weir can extend entirely to upper end cap 50, with the upper end of the weir being perforated or otherwise allowing fluid communication between recharge canister 44 and filter media 45. In any case, the weir 103 is preferably fixed to lower end cap 52 such as by the same adhesive fixing the media to the end cap.

Recharge canister 44 includes a cylindrical body portion 110 enclosing appropriate inhibitor material. Membranes can be provided on one or both axial ends of the body portion which degrade over time and expose the inhibitor material to the fluid flowing through the assembly. An upper annular side wall 112 extends axially upward from an upper end of the body 110, and includes a series of flow openings as at 113, preferably equally-spaced around the side wall. The upper end of side wall 112 seals against the upper end of weir 103, which can have a radially-inward directed annular flange 114 for this purpose. A lower annular side wall 115 extends axially downward from a lower end of body 110. Body 110 has an outer diameter such that an annular flow passage 118 is provided between body 110 and weir 103. Preferred recharge canisters are commercially available from Long Manufacturing Ltd. of Oakville, Canada, and the structure and operation of such canisters is illustrated and described, for example, in U.S. Pat. Nos. 4,782,891 and 4,333,516. Other recharge canisters than these may of course be appropriate, depending upon the particular application.

A series of tabs 120 are provided in upper end cap 50, and project axially downward from the lower surface of planar end wall 72, radially inward of media 45. Tabs 120 are preferably equally-spaced around the end wall in an annular array, and each includes an outwardly-directed shoulder as at 124 (seen best in FIG. 4) which closely receives and inwardly bounds the upper side wall 112 of the recharge canister. The shoulder 124 supports the side wall in a spaced-apart manner from end wall 72, such that a series of flow openings, as at 125, are defined between the tabs. It should be appreciated that flow openings 125 are closely adjacent annular flow passage 105 provided between the upper end of the weir and the upper end cap.

The lower end cap 52 similarly includes a series of tabs 130 which project axially upward from the annular portion 54, radially inward of media 45. Tabs 130 are also arranged in an annular array and each includes a shoulder 131 which closely receives and inwardly bounds the lower side wall 115 of the recharge canister. The shoulder 131 supports the side wall in a spaced-apart manner from the second end cap such that a series of flow openings as at 132 are defined between the tabs. While tabs 120 of upper end cap 50 generally extend in a circumferential direction, tabs 130 of lower end cap 52 generally extend in a radial direction.

The fluid flow to be recharged and filtered enters through the housing inlet 28 and passes through the flow paths defined between the ribs 59 on the lower end cap 52 into the peripheral flow passage 60 between the filter element and canister. The flow then passes radially inward through the filter media 45, where the flow is filtered, and then passes through the flow passage 105 defined between the upper end cap and the upper end of the weir and through the flow openings 125 defined between tabs 120. The liquid then comes into contact with the inhibitor at the upper end of the recharge canister, where the liquid is recharged as necessary. The recharged liquid then flows through the flow openings 113 in the upper annular side wall of the recharge canister, and downwardly through the flow passage 118 defined between the recharge canister and the weir. The flow then passes through the passages 132 defined between the tabs on the lower end cap, and enters the passage 33 in central standpipe 32, where the flow then passes to the housing outlet 30. Again, inlet port 28 and outlet port 30 can be reversed, and the flow can go in the opposite directions through the media.

A temperature sensor/switch, indicated generally at 150, is provided in fluid communication with the coolant to provide temperature information to the user. In addition, a switch assembly, indicated at 160, can be provided having an elongated rod 162 biased by spring 164 into contact with the lower end of body 110 of recharge canister 44. When the cartridge 42 is properly located within the housing, the switch 160, through the movement of rod 162, provides an appropriate indication to the user. As the inhibitor in the canister is spent, the bottom membrane or end wall of the recharge canister will begin to corrode, thereby weakening the membrane or end wall to the point where rod 162 will break through the end wall. When this happens, the switch can provide an indication to the user that the cartridge 42 needs to be replaced. Both the temperature sensor 150 and the switch assembly 160 will be discussed in more detail below.

Figure 7:
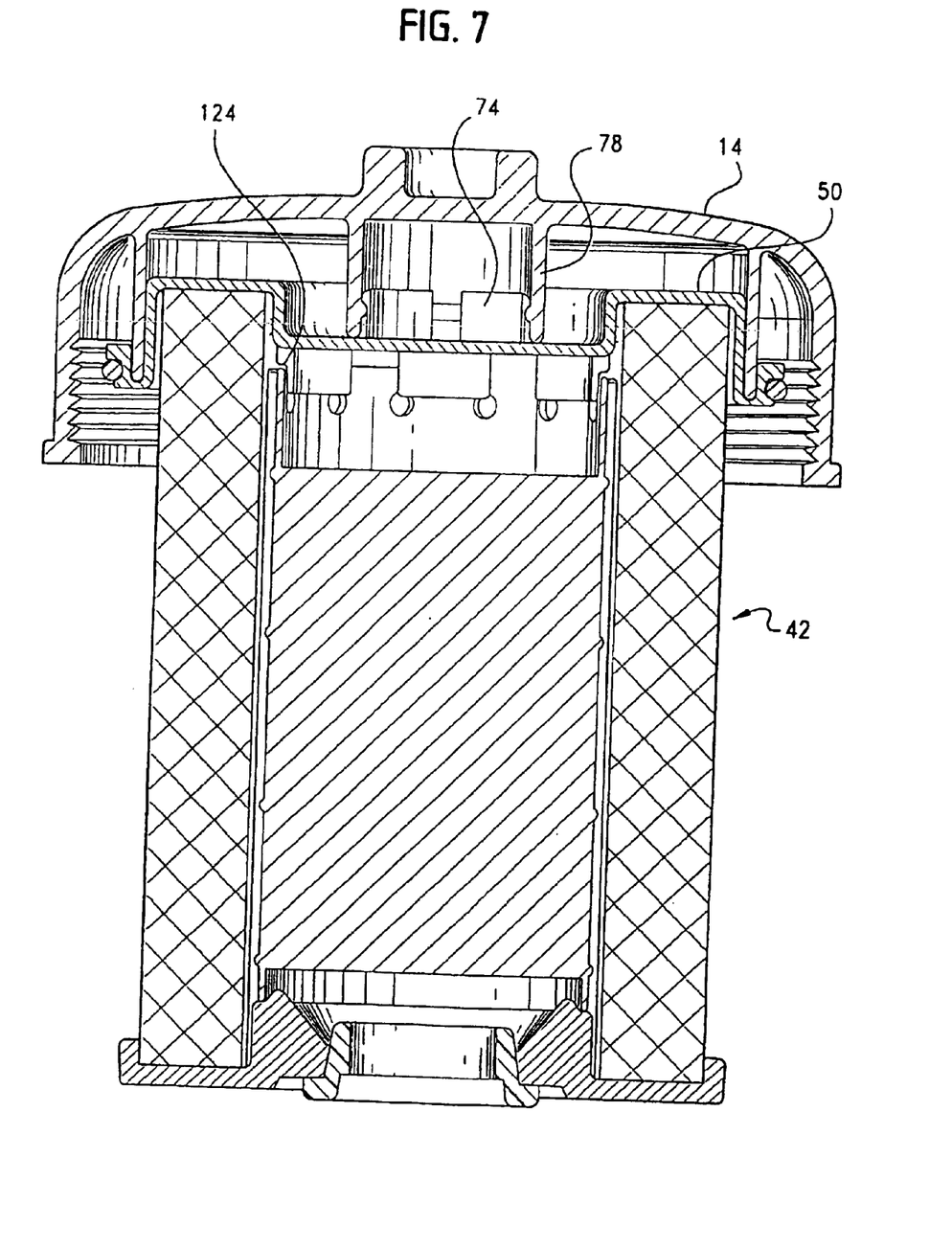
FIG. 7 is a cross-sectional side view of the regeneration and filter cartridge shown coupled to the cover of the housing.

To remove and replace a spent cartridge, the cover 14 is removed, i.e., unscrewed from canister 13, thereby also removing the cartridge 42, as shown in FIG. 7. Again, the mating ring 78 on cover 14 cooperates with latching fingers 74 on upper end cap 50 to remove the cartridge with the cover. The cartridge can then be easily removed from cover 14 by simply pulling the cartridge away from the cover, and replacing the cartridge with a fresh cartridge.

While it is described above that the present invention provides a combination recharge canister and filter element to recharge and filter liquid coolant, it should be appreciated that the filter element could be used independently of the recharge canister to provide filtration of liquid in other types of fluid systems.

Thus, as described above, a compact and integral recharge and filter assembly is provided, where the assembly includes a recharge and filter cartridge as a single component that can be easily accessed and removed when spent, and recharges liquid coolant and removes particulates and other harmful contaminants from the liquid. The assembly is robust and dependable, and has components that are relatively easy to manufacture, low in manufacturing and maintenance costs, and have a long life.

The present invention includes a coolant regeneration and filter device or coolant regeneration system 10 wherein the operation of the system is monitored. Monitoring the operation of this system includes monitoring the temperature of the coolant and detecting the structural failure of a wall of the regeneration cartridge 44 which would be an indicator for replacing the regeneration canister 44. In the former instance, the operator of the engine is wanting to observe if there is a temperature drop in the coolant fluid which would, in turn, indicate a blockage in the filter. The blockage would cause the temperature to decline with coolant residing in the housing for a longer time than normal thereby permitting heat of the coolant to radiate out of the housing. If there is an indication that the filter is clogged the operator can then have the system inspected and filter 43 which has cartridge 44 disposed therein replaced. Moreover, the cause of the blockage can be evaluated and the cause can also then be corrected. On the latter instance, the operator will understand the wall of the canister 44 corroded through and structurally failed indicating the corrosion inhibitors have been used to regenerate the coolant and as a result canister 44 will need to be replaced. The monitoring of the temperature and monitor for the structural failure of a wall of the canister typically are linked electrically in series with a warning indicator which when actuated would precipitate an inspection. The inspection would determine the cause of the warning indicator being triggered. On the other hand, the two monitors could be on separate electrical circuits having their own corresponding warning indicator. Thus, when a particular warning indicator is actuated, the operator will know which monitor is triggering the warning indicator.

The coolant, represented by the flow arrows in FIGS. 3 and 4, flows into the system 10 through inlet port 28 and flows through the filter media 43 and over and along the regeneration canister or cartridge 44, positioned within the filter 43, and exits out of the outlet port 30. As the coolant circulates through the coolant system of a combustion engine, the corrosion inhibitors degrade. As a result, canister 44 which carries corrosion inhibitors are released into the coolant stream as a wall of the regeneration canister 44 is corroded and breached releasing corrosion inhibitors into the coolant stream. This release of corrosion inhibitors recharges the coolant and reduces damage that would be caused by the coolant going unattended and either not being removed or recharged with inhibitors.

Monitoring of the operation of the coolant regeneration system 10 includes a means for monitoring the temperature of the coolant stream. This can be accomplished with a number devices which will measure the temperature of a fluid. In FIG. 3, temperature sensing element 150, is shown, positioned in the coolant stream at chamber 36. Temperature sensor element 150 such as a temperature switch of the kind manufactured by the Thermo-O-Disc® Corporation of Mansfield, Ohio which is known as a bi-metal disc such as Part Number 32467 can be employed to detect the temperature of the coolant fluid. Alternative embodiments would include other temperature sensors and switches including thermo couples.

For the present example of this invention, it is known that in large trucks their coolant fluid under normal operating temperatures reaches temperatures of 160 degrees Fahrenheit to 240 degrees Fahrenheit with the engine fully warmed up and operational such as warming the engine for 8 to 10 minutes or operating the truck within the truck's specifications. With the clogging of the filter, for example, with oil that may have leaked into the coolant system through a breach in a gasket, the flow of the coolant will be slowed down and the coolant fluid will reside in the housing for a longer time than normal, resulting in heat radiating from the coolant out through the housing. This will cause the coolant to drop in temperature below what temperature it would normally be at in normal operation. In the present truck vehicle example, a predetermined threshold temperature of approximately 120 degrees Fahrenheit is a temperature set point for sensor 150. If the coolant temperature drops below its normal operating temperature and the sensor senses the temperature below its predetermined threshold, the sensor will actuate a warning indicator to communicate to the operator of the engine. Thus, for a given engine, a set point temperature can be selected below normal operating temperature of the coolant to trigger a warning to the operator of the engine.

Communicating to the operator the temperature of the coolant is below the predetermined threshold is accomplished through sensor 150 activating a warning indicator (not shown). The sensor closes a switch for a simple electrical circuit which in turn activates the warning indicator. The warning indicator can take on many forms such as a visual indicator in the form of a warning light on a dash board or even an audible one as a buzzer or a voice warning device in the cab of the vehicle. This warning indicator could also include a computer processor which could also be in communication with the owner of the truck at a remote location. With the indicator activated, the operator can then take corrective action.

Sensor 150 is positioned within the coolant and can be positioned in a number of places in the coolant system where the temperature drop of the coolant can be sensed as a result of the filter being clogged. As seen in FIG. 3, sensor 150 is positioned in chamber 36 which is fed from inlet port 28.

An instrumental element of the coolant regeneration system 10 includes the regeneration canister or cartridge 44. The canister 44 contains corrosion inhibitors as identified above and described, for example in U.S. Pat. Nos. 4,782,891 and 4,333,516 as well as others that are known and would be applicable to various needs.

The operation of a coolant regeneration system is described in U.S. Pat. No. 6,235,194 (Jousett), the contents of which is incorporated herein. As is described in the Jousett patent, once the coolant begins to circulate in the cooling system, the corrosion inhibitors in the coolant breakdown. This causes the radiator and piping associated with the cooling system to begin to corrode thereby endangering the integrity of the system. One way to regenerate the coolant and maintain the integrity of the cooling system is to periodically introduce corrosion inhibitors into the coolant stream.

Canister 44 can take a number of constructions, which includes containing a single compartment to containing multiple compartments such as 200, 201 and 203 as seen in FIGS. 3 and 4, which will hold corrosion inhibitor 198.

Generally, the sidewalls 202 of canister 44, as seen in FIGS. 3, 4, 8 and 9 are constructed of non-corrosive material for this coolant stream environment, such as plastic, copper and the like. However, opposing ends 204 are constructed of a corrodible material in order for the corrosion inhibitors to be accessed within the canister as the coolant stream degrades. The corrodible end walls 204 are constructed of less noble metals or metal alloys at the active end of the galvanic series of metals. End walls 204 are constructed of magnesium and magnesium alloys, for example, a particular alloy suitable for this invention contains, in weight by percentage 23% Al, one or more of 0.1–0.2% Fe, 2% Pb, 2% Sn, 0.1% Ni, 0.1% Cu with the balance being magnesium and being approximately 0.05 inches in thickness, all of which is set forth in above identified U.S. Pat. No. 4,782,891. Thus, the material of end wall 205, as seen in FIGS. 3 and 4, will corrode and fail or breach structurally before damage would be imparted to the coolant system thereby releasing the inhibitor 198 into the coolant stream in compartment 200. The inhibitor 198 is known and also discussed in the above-identified patents and takes on various physical forms of liquid, powder or even paste.

The compartment walls 206 and 207, seen in FIGS. 3 and 4, are constructed of typically the same material as the end walls 204 and of the same thickness as described above. Thus, in the operation of cartridge 44, coolant stream runs over the (for purposes of ease in describing the present invention, orientations will be used but are not intended to limit the invention in any absolute orientation) top end wall 205 of canister 44, and as the coolant becomes more corrosive the top end wall 205 begins to corrode until it fails and releases the content of inhibitor 198 contained within that compartment 200. Compartment wall 206 then begins to corrode as the coolant stream becomes more corrosive and the process repeats itself until the inhibitor 198 in compartment 201 is released and likewise compartment wall 207 later corrodes and breaches exposing the inhibitor 198 into the coolant stream from the last compartment 203.

Figure 8:
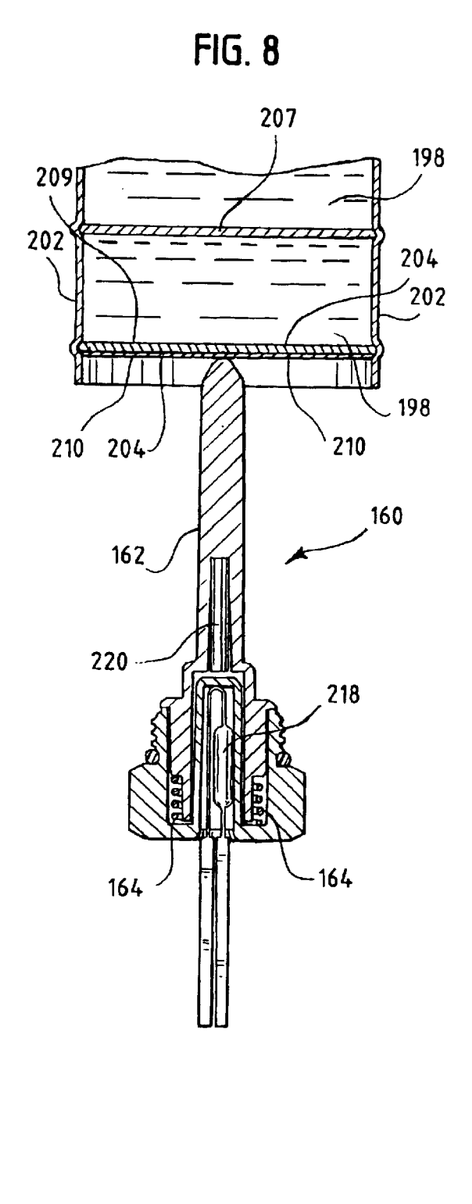
FIG. 8 is an enlarged isolated cross-sectional view of the integrity sensor and regeneration canister with the regeneration canister not depleted of corrosion inhibitor.
Figure 9:
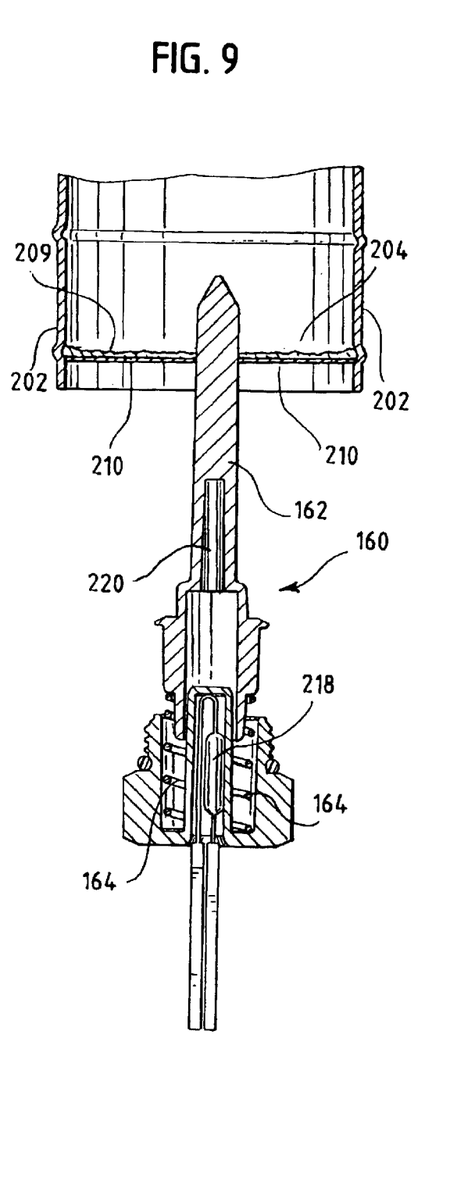
FIG. 9 is an enlarged isolated cross-sectional view of the integrity sensor and regeneration canister with the regeneration canister depleted of corrosion inhibitor.

At this point, the regeneration canister is no longer capable of recharging the coolant stream. This would be the case regardless of whether there was only one compartment in the canister 44 or multiple compartments as just described. It should be noted that the opposing wall or bottom end wall 209 of canister 44 would normally be exposed from the outside of the canister 44 to the corrosive coolant stream. Thus, to prevent the premature breaching of the end wall 209 from corrosion from the outside toward the inside of canister 44 and only allowing bottom wall 209 to fail from the inside of canister 44, a coating 210 is provided over the outside bottom end wall 209. Coating 210, as seen in FIGS. 8 and 9 can be constructed of corrosive resistant material to the coolant environment it will be exposed. Examples of the corrosive resistant material include cellulose or epoxy paint or even powder coated or rubber-like materials such as urethane which resist corrosion in this coolant environment.

The means for monitoring the operation of the system includes a means for monitoring the structural integrity of a wall of the regeneration canister 44. A regeneration canister deterioration sensor which is in operative engagement with regeneration canister 44 is provided in the present embodiment of which examples include an integrity probe 160 as seen in FIGS. 3 and 4, as well as, 8 and 9. For purposes of this discussion, integrity probe 160 as shown in FIGS. 8 and 9 will be described. The integrity probe 160 is in contact with the bottom wall 209. The probe 160 has spring 164, having, for this example, an uncompressed length of 0.88 inches. Spring 164 will need 7.9 pounds to compress the spring to a length of 0.66 inches with a tolerance of +/−10%. Spring 164 biases plunger 162 against bottom end wall 209 and exerts a force with the compression of spring 164 by generally at least a few tenths of an inch against wall 209, as seen in FIG. 8. It is generally understood for this invention that the spring will be strong enough to push through the coating once end wall 209 has been corroded.

Integrity probe 160 is electrically connected to a warning indicator, as discussed earlier, which will indicate to the operator that bottom wall 209 has failed and cartridge 44 needs replacing. Probe 160 contains a switch 218 and plunger 162 which are contained within a glass filled nylon with a magnet 220 positioned in the plunger of the probe and a reed switch 218 potted into the body of the device. The reed switch 218 is potted into the body of the device with non-conductive epoxy. The integrity probe 160 can be inserted through the bottom of the housing 12 and sealed therein through use of an O-ring, for example.

During normal operation, the plunger 162 is biased or applies a force against wall 209 with spring 164 compressed, as seen in FIG. 8. In this position, the magnet 220 is in a relatively lower position maintaining the reed switch 218 in an open condition and therefore not activating any warning indicator. However, when bottom wall 209 has failed through corrosion from the inside of the canister, as described above, spring 164 extends and pushes plunger 162 to an extended position through failed wall 209, as seen in FIG. 9. With plunger 162 moving upward and magnet 220 likewise moving, the reed switch 218 closes. The closing of reed switch 218 closes the electrical circuit to the various earlier described warning indicators for informing the operator canister 44 needs replacement.

As earlier discussed, coating 210 positioned, in the present embodiment, on the outside surface of end wall 209, and is positioned between the plunger 162 of probe 160 and the outside surface of wall 209, as shown in FIG. 8. As previously explained, coating 210 prevents wall 209 from prematurely corroding from the outside toward the inside and allows, in this embodiment, the wall 209 to corrode from the inside toward the outside. Thus, the selection of the material for the coating includes permitting plunger 162 to push through the coating 210 with wall 209 corroded utilizing spring 164 force.

The invention includes a method for maintaining the operation of a coolant regeneration system 10. The system includes providing a temperature sensing element 150 which will be electrically connected to a warning indicator such that element sensor 150 will activate the warning indicator once it senses a temperature below a set predetermined temperature. The method includes positioning sensor 150 in order for it to sense the temperature of the coolant stream. Thus, this may include positioning sensor 150 in the path in which the coolant stream will travel, as seen in FIG. 3 in which sensor 150 is positioned in chamber 36 within the housing which also contains filter 45.

The method also includes selecting a temperature sensor 150 which will detect a temperature less than a temperature of the coolant stream on an internal combustion engine under normal operating conditions, as discussed above.

Additionally, this invention includes a method for maintaining the operation of a coolant regeneration system which includes a regeneration canister 44 positioned in a coolant stream in which the canister contains corrosion inhibitor. The method includes providing a canister 44 deterioration sensor to activate a waning indicator upon structural failure of a wall 209 of canister 44. The method also includes positioning canister deterioration sensor to be capable of detecting the structural failure of the wall 209. In the embodiment described above, plunger 162 of probe 160 is positioned against wall 209 and applies a spring 164 generated force against wall 209.

The method further provides, as described earlier, wall 209 constructed of a corrodible material, in which wall 209 is covered with a coating 210 on the outside of wall 209 which is corrosion resistant. Coating 210, as described above, is positioned between plunger 162 and wall 209. Also, the method provides permitting the integrity probe 160 to move through coating 210 and intrude into the canister with the force provided by spring 164. In addition, the method provides for providing switch 218 associated with probe 160, which will close an electrical circuit with plunger 162 intruding into the canister 44. The electrical circuit will activate a warning indicator to the operator which will result in regeneration canister 44 being timely replaced.

Various embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coolant regeneration system comprised of:
   a housing having an inlet port and an outlet port adapted to be in flow communication with a coolant stream;
   a filter positioned in the coolant stream;
   a regeneration canister containing a corrosion inhibitor positioned in the coolant stream; and
   means for monitoring the structural integrity of a wall of the regeneration canister.

2. The coolant regeneration system of claim 1 wherein the filter and the regeneration canister are positioned within the housing.

3. The coolant regeneration system of claim 1 wherein the means for monitoring the structural integrity of a wall of the regeneration canister includes a warning indicator.

4. The coolant regeneration system of claim 3 wherein the warning indicator is a visual indicator.

5. The coolant regeneration system of claim 4 wherein the visual indicator is a light.

6. The coolant regeneration system of claim 3 wherein the warning indicator is an audio indicator.

7. The coolant regeneration system of claim 3 wherein the warning indicator includes a computer processor.

8. The coolant regeneration system of claim 1 wherein the regeneration canister is constructed of multiple compartments in which each compartment contains a corrosion inhibitor and each compartment is separated with a compartment wall constructed of a corrodible material.

9. The coolant regeneration system of claim 8 in which the canister has opposing ends each constructed of corrodible material.

10. The coolant regeneration system of claim 9 in which corrodible material for construction of the compartment wall and the opposing end is the same material.

11. The coolant regeneration system of claim 1 wherein the means for monitoring the structural integrity of a wall of the regeneration canister is comprised of an integrity probe adapted to apply a force against the wall of the regeneration canister.

12. The coolant regeneration system of claim 11 wherein the regeneration canister is constructed of multiple compartments in which each of the multiple compartments are separated with a compartment wall constructed of a corrodible material.

13. The coolant regeneration system of claim 12 wherein the regeneration canister has opposing ends in which each end is constructed of a corrodible material.

14. The coolant regeneration system of claim 13 wherein the corrodible material of the compartment wall and the corrodible material of the opposing ends is the same material.

15. The coolant regeneration system of claim 13 wherein the wall is an opposing end.

16. The coolant regeneration system of claim 15 wherein a corrosion resistant coating is positioned over the opposing end wall between the opposing end wall and the integrity probe.

17. The coolant regeneration system of claim 16 wherein the corrosion resistant coating is constructed of a paint.

18. The coolant regeneration system of claim 16 wherein the corrosive resistant coating is constructed of urethane.

19. The coolant regeneration system of claim 16 wherein the corrosive resistant coating is constructed of cellulose.

20. The coolant regeneration system of claim 11 wherein the integrity probe applies the force with a spring.

21. The coolant regeneration system of claim 11 wherein the integrity probe positioned outside of the canister.

22. The coolant regeneration system of claim 11 wherein the integrity probe is electrically connected to a warning indicator.

23. The coolant regeneration system of claim 22 wherein the integrity probe includes an electrical switch.

24. The coolant regeneration system of claim 23 in which the switch is a reed switch.

25. The coolant regeneration system of claim 23 in which the electrical switch is open with the integrity probe in a position to apply the force against the wall of the regeneration canister.

26. The coolant regeneration system of claim 25 in which the electrical switch is in a closed position with the integrity probe in a position extended from the position in which the integrity probe applies the force against the wall of the regeneration canister.

27. The coolant regeneration system of claim 1 wherein the corrosion inhibitor is in a powder form.

28. The coolant regeneration system of claim 1 wherein the corrosion inhibitor is in a liquid form.

29. A coolant regeneration system comprised of:
   a housing having an inlet port and an outlet port adapted to be in flow communication with a coolant stream;
   a filter positioned in the coolant stream;
   a regeneration canister containing corrosion inhibitor positioned in the coolant stream; and
   a regeneration canister deterioration sensor in operative engagement with the regeneration canister.

30. The coolant regeneration system of claim 29 in which the filter and the regeneration canister are positioned in the housing.

31. The coolant regeneration system of claim 29 wherein the regeneration canister is constructed of multiple compartments in which each compartment contains a corrosion inhibitor and each compartment is separated with a compartment wall constructed of a corrodible material.

32. The coolant regeneration system of claim 31 in which the canister has opposing ends each constructed of corrodible material.

33. The coolant regeneration system of claim 32 in which the corrodible material for construction of the compartment wall and the opposing end is the same material.

34. The coolant regeneration system of claim 29 wherein the regeneration canister deterioration sensor is comprised of an integrity probe adapted to apply a force against a wall of the regeneration canister.

35. The coolant regeneration system of claim 34 wherein the integrity probe applies the force with a spring.

36. The coolant regeneration system of claim 34 wherein the regeneration canister is constructed of multiple compartments within the canister in which each compartment contains corrosion inhibitor and each compartment is separated with a compartment wall constructed of a corrodible material.

37. The coolant regeneration system of claim 36 wherein the regeneration canister has opposing ends in which each end is constructed of a corrodible material.

38. The coolant regeneration system of claim 37 wherein the corrodible material of the compartment wall and the corrodible material of the opposing ends is the same material.

39. The coolant regeneration system of claim 37 wherein the wall is an opposing end.

40. The coolant regeneration system of claim 39 wherein a corrosive resistant coating is positioned over the opposing end wall between the opposing end wall and the integrity probe.

41. The coolant regeneration system of claim 40 wherein the corrosive resistant coating is constructed of a paint.

42. The coolant regeneration system of claim 40 wherein the corrosive resistant coating is constructed of urethane.

43. The coolant regeneration system of claim 40 wherein the corrosive resistant coating is constructed of cellulose.

44. The coolant regeneration system of claim 34 wherein the integrity probe positioned outside of the canister.

45. The coolant regeneration system of claim 34 wherein the integrity probe is electrically connected to a warning indicator.

46. The coolant regeneration system of claim 45 wherein the integrity probe includes an electrical switch.

47. The coolant regeneration system of claim 46 in which the switch is a reed switch.

48. The coolant regeneration system of claim 46 in which the electrical switch is open with the integrity probe in a position to apply the force against the wall of the regeneration canister.

49. The coolant regeneration system of claim 46 in which the electrical switch is in a closed position with the integrity probe in a position extended from the position in which the probe applies the force against the wall of the regeneration canister.

50. The coolant regeneration system of claim 29 wherein regeneration canister deterioration sensor includes a warning indicator.

51. The coolant regeneration system of claim 50 wherein the warning indicator is a visual indicator.

52. The coolant regeneration system of claim 51 wherein the visual indicator is a light.

53. The coolant regeneration system of claim 50 wherein the warning indicator is an audio indicator.

54. The coolant regeneration system of claim 50 wherein the warning indicator includes a computer processor.

55. The coolant regeneration system of claim 29 wherein the corrosion inhibitor is in a powder form.

56. The coolant regeneration system of claim 29 wherein the corrosion inhibitor is in a liquid form.

57. A coolant regeneration system having a housing with inlet port and an outlet port in flow communication with a coolant stream, a filter and a regeneration canister containing a corrosion inhibitor positioned in the coolant stream, comprising:

an integrity probe positioned against a wall of the regeneration canister; and a non-corrosive coating positioned on the wall of the canister and between the canister and the integrity probe.

58. The coolant regeneration system of claim 57 in which the coating is a paint.

59. The coolant regeneration system of claim 57 in which the coating is urethane.

60. The coolant regeneration system of claim 57 in which the wall is positioned on an end of the canister.

61. The coolant regeneration system of claim 57 in which the coating is positioned on an outside of the canister.

62. The coolant regeneration system of claim 57 in which the boating is cellulose.

* * * * *

UNITED STATES PATENT AND TRADEMARK OFFICE
CERTIFICATE OF CORRECTION

PATENT NO. : 6,835,304 B2
DATED : December 28, 2004
INVENTOR(S) : Todd A. Jousset, Edward R. Eaton and Steven R. Knight It is certified that error appears in the above-identified patent and that said Letters Patent is hereby corrected as shown below:

Column 3,
Line 56, change "or" to -- of --.

Column 7,
Line 32, after "number" insert -- of --.

Column 14,
Line 28, change "boating" to -- coating --.

Signed and Sealed this

Tenth Day of May, 2005

JON W. DUDAS
*Director of the United States Patent and Trademark Office*